US011101826B2

(12) United States Patent
Liu et al.

(10) Patent No.: US 11,101,826 B2
(45) Date of Patent: *Aug. 24, 2021

(54) RF CONTROL CIRCUIT AND MOBILE TERMINAL

(71) Applicant: GUANGDONG OPPO MOBILE TELECOMMUNICATIONS CORP., LTD., Guangdong (CN)

(72) Inventors: Qiuwen Liu, Guangdong (CN); Xianlong Chen, Guangdong (CN); Jiafeng Yang, Guangdong (CN); Xianping Xiong, Guangdong (CN); Guoxi Zhang, Guangdong (CN); Shaoming Pang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 155 days.

This patent is subject to a terminal disclaimer.

(21) Appl. No.: 16/261,659

(22) Filed: Jan. 30, 2019

(65) Prior Publication Data

US 2019/0229756 A1    Jul. 25, 2019

Related U.S. Application Data

(63) Continuation-in-part of application No. PCT/CN2017/082235, filed on Apr. 27, 2017.

(30) Foreign Application Priority Data

Aug. 2, 2016   (CN) .......................... 201610630191.9

(51) Int. Cl.
*H04B 1/00* (2006.01)
*H04B 1/52* (2015.01)
(Continued)

(52) U.S. Cl.
CPC ............. *H04B 1/0057* (2013.01); *H04B 1/52* (2013.01); *H04B 1/525* (2013.01); *H04W 88/06* (2013.01)

(58) Field of Classification Search
CPC ........ H04B 1/0057; H04B 1/525; H04B 1/52; H04B 1/401; H04W 88/06
See application file for complete search history.

(56) References Cited

U.S. PATENT DOCUMENTS 9,210,695 B2   12/2015  Kim et al.
10,382,071 B2 *  8/2019  Rozek ....................... G05F 3/02
(Continued)

FOREIGN PATENT DOCUMENTS

CN   101442839 A   5/2009
CN   103109457 A   5/2013
(Continued)

OTHER PUBLICATIONS

First Office Action from China patent office in a counterpart China publication No. CN106301462A, dated Jun. 5, 2017 (6 pages).
(Continued)

*Primary Examiner* — Hoang-Chuong Q Vu
(74) *Attorney, Agent, or Firm* — Ladas & Parry LLP

(57) ABSTRACT

A radio frequency (RF) control circuit is disclosed. The RF control circuit includes a transceiver module and a front-end module. The front-end module is connected to the transceiver module via a primary component carrier (PCC) path and a secondary component carrier (SCC) path. The front-end module is configured to receive an external data signal and transmit a local data signal. The transceiver module is configured to receive a PCC signal from the external data signal and transmitting the PCC signal from the local data signal through the PCC path and receiving a SCC signal from the external data signal and transmitting the SCC
(Continued)

signal from the local data signal through the SCC path. The SCC path is controlled to be grounded such that interference of the local data signal for the PCC path on the external data signal for the SCC path is eliminated. A mobile terminal is also disclosed.

20 Claims, 4 Drawing Sheets

(51) Int. Cl.
*H04W 88/06* (2009.01)
*H04B 1/525* (2015.01)

(56) References Cited

U.S. PATENT DOCUMENTS

| | | | |
|---|---|---|---|
| 2004/0214530 | A1 | 10/2004 | Brandt et al. |
| 2012/0275350 | A1* | 11/2012 | Kwok .................. H04B 1/406 370/277 |
| 2013/0114470 | A1 | 5/2013 | Lee et al. |
| 2013/0176914 | A1* | 7/2013 | Khlat .................... H04B 1/525 370/278 |
| 2013/0259102 | A1* | 10/2013 | Gudem ................ H04B 1/3805 375/219 |
| 2013/0273859 | A1* | 10/2013 | King .................... H04B 17/336 455/78 |
| 2014/0072001 | A1* | 3/2014 | Chang .................. H04B 1/0064 370/542 |
| 2014/0313993 | A1* | 10/2014 | Tabet .................... H04L 5/001 370/329 |
| 2014/0321312 | A1* | 10/2014 | Narahashi ............. H04B 1/525 370/252 |
| 2015/0117279 | A1 | 4/2015 | Kim |
| 2015/0207482 | A1* | 7/2015 | Abdel Ghany ......... H03F 3/193 455/234.1 |
| 2015/0222410 | A1 | 8/2015 | Belghoul et al. |
| 2015/0230206 | A1* | 8/2015 | Tabet .................. H04W 52/346 370/329 |
| 2015/0341076 | A1 | 11/2015 | Uejima |
| 2016/0227462 | A1* | 8/2016 | Axmon .................. H04W 36/32 |
| 2016/0254590 | A1* | 9/2016 | Seo ........................ H01Q 1/243 343/876 |
| 2016/0254828 | A1 | 9/2016 | Hayafuji |
| 2016/0285503 | A1 | 9/2016 | Poulin et al. |
| 2017/0026136 | A1* | 1/2017 | Thompson ............. H04B 1/006 |
| 2017/0201369 | A1* | 7/2017 | Ella ....................... H04L 5/1461 |
| 2017/0279666 | A1 | 9/2017 | Liu |
| 2017/0310801 | A1* | 10/2017 | Shen ..................... H04W 12/02 |
| 2017/0373730 | A1* | 12/2017 | Pehlke ..................... H04B 1/44 |
| 2018/0019768 | A1* | 1/2018 | King ................... H04L 27/0002 |
| 2018/0034152 | A1* | 2/2018 | Mura ..................... H04B 1/006 |

FOREIGN PATENT DOCUMENTS

| | | |
|---|---|---|
| CN | 103109457 A | 5/2013 |
| CN | 203135865 U | 8/2013 |
| CN | 104954052 A | 9/2015 |
| CN | 104995845 A | 10/2015 |
| CN | 104995845 A | 10/2015 |
| CN | 105376872 A | 3/2016 |
| CN | 105471557 A | 4/2016 |
| CN | 106301462 A | 1/2017 |
| JP | 2002325271 A | 11/2002 |
| WO | 2015053045 A1 | 4/2015 |
| WO | WO2015053045 A1 | 4/2015 |

OTHER PUBLICATIONS

Supplementary search report from China patent office in a counterpart China publication No. CN106301462A, dated Jun. 24, 2017 (1 pages).
European search report for Application No. EP17836187.9, dated Jul. 4, 2019 (8 pages).
Notice of Allowance in U.S. Appl. No. 16/440,464, dated Jan. 27, 2020 (19 pages).
Indian Examination Report for Application No. IN 201917006288 dated Sep. 30, 2020 (6 pages).

* cited by examiner

RF CONTROL CIRCUIT AND MOBILE TERMINAL

CROSS REFERENCE TO RELATED APPLICATIONS

The present application is a continuation-in-part (CIP) application of International (PCT) Patent Application No. PCT/CN2017/082235 filed Apr. 27, 2017, which claims a foreign priority of Chinese Patent Application No. 201610630191.9, filed on Aug. 2, 2016, the contents of which is herein incorporated by reference in its entirety.

TECHNICAL FIELD

The present application relates to the field of communications, and in particular, to a RF control circuit and a mobile terminal.

BACKGROUND

Carrier Aggregation (CA) is a technology that increases the transmission bandwidth. 2~5 LTE (Long Term Evolution) component carriers (CCs) may be aggregated to achieve maximum 100 MHz transmission bandwidth, which effectively increases the uplink and downlink transmission rate. In carrier aggregation technology, a carrier frequency band includes at least one primary component carrier (PCC) and at least one secondary component carrier (SCC).

When carrier aggregation is performed by an existing carrier-aggregated RF circuit, since multiple frequency band carriers share one power amplifier (such as a multi-mode multi-frequency power amplifier), a harmonic (e.g., a secondary or third harmonic) of a certain P-band carrier signal, which is generated when the P-band carrier signal is amplified by the power amplifier, is easily connected to a signal receiving path of another Q-band carrier when the power amplifier simultaneously transmits multiple frequency band carrier signals. At this time, the harmonic signal may have an interfere on the reception of the Q-band carrier signal, resulting in poor reception quality of the Q-band carrier signal and having an effect on the signal reception performance of the carrier aggregation in turn. For example, the second or third harmonic of the PCC in a low frequency is easily connected to the receiving path of SCCs in medium and high frequencies, which will have an interfere on the reception of the SCCs in medium and high frequencies. Thus, the reception quality of the SCCs in medium and high frequencies becomes poor, which affects the stability of an antenna and the transmission performance.

SUMMARY OF THE DISCLOSURE

A RF control circuit and a mobile terminal are provided in embodiments of the present application, which improve stability and transmission performance of an antenna.

A RF control circuit is provided in an embodiment of the present application, which includes a transceiver module and a front-end module. The front-end module is connected to the transceiver module via a primary component carrier (PCC) path and a secondary component carrier (SCC) path, and is configured to receive an external data signal and transmit a local data signal. The transceiver module is configured to receive a PCC signal from the external data signal and transmitting the PCC signal from the local data signal through the PCC path and receiving a SCC signal from the external data signal and transmitting the SCC signal from the local data signal through the SCC path. The SCC path is controlled to be grounded such that interference of the local data signal for the PCC path on the external data signal for the SCC path is eliminated.

A RF control circuit is provided in another embodiment of the present application, which includes a primary component carrier (PCC) path and a secondary component carrier (SCC) path. The primary component carrier (PCC) path and secondary component carrier (SCC) path are connected to a transceiver module and a front-end module, respectively. The front-end module is configured to receive an external data signal and transmit a local data signal, and the transceiver module is configured to receive a PCC signal from the external data signal and transmitting the PCC signal from the local data signal through the PCC path and receiving a SCC signal from the external data signal and transmitting the SCC signal from the local data signal through the SCC path. The SCC path is controlled to be grounded such that interference of the local data signal for the PCC path on the external data signal for the SCC path is eliminated.

A mobile terminal using the above RF control circuit is also provided in the present application.

DETAILED DESCRIPTION

Figure 1:
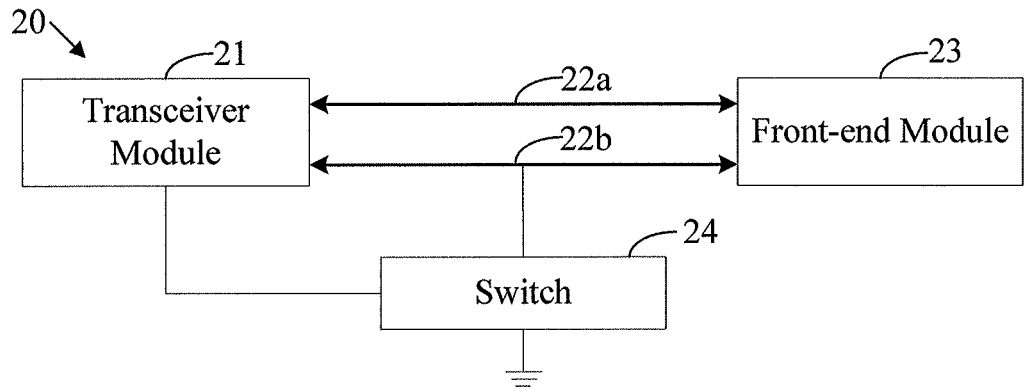
FIG. 1 is a schematic diagram of a RF control circuit according to an embodiment of the present application.

The technical solutions in the embodiments of the present application are clearly and completely described in the following with reference to the accompanying drawings in the embodiments of the present application. It is obvious that the described embodiments are only a part of the embodiments of the present application, but not all embodiments. All other embodiments obtained by a person skilled in the art based on the embodiments of the present application without creative efforts are within the scope of the present application.

The terms "first", "second" and "third" in the present application are used to distinguish different objects, and are not intended to describe a specific order. Furthermore, the terms "comprise" and "have" and variations thereof are intended to cover a non-exclusive inclusion. For example, a process, a method, a system, a product, or a device that comprises a series of steps or units is not limited to the listed steps or units, but optionally includes steps or units not listed, or optionally include other steps or units inherent to these processes, methods, products or devices.

References to "embodiment" herein mean that the specific features, structures, or characteristics described in connection with the embodiments can be included in at least one embodiment of the present application. The phrase appears in various places in the specification are not necessarily referring to the same embodiment, and are not exclusive or alternative embodiments that are mutually exclusive. Those skilled in the art will explicitly understand and implicitly understand that the embodiments described herein can be combined with other embodiments.

In one embodiment, a radio frequency (RF) control circuit is provided. The circuit includes a transceiver module and a front-end module. The front-end module is connected to the transceiver module via a primary component carrier (PCC) path and a secondary component carrier (SCC) path, and is configured to receive an external data signal and transmit a local data signal. The transceiver module is configured to receive a PCC signal from the external data signal and transmit the PCC signal from the local data signal through the PCC path and receive a SCC signal from the external data signal and transmit the SCC signal from the local data signal through the SCC path. The SCC path is controlled to be grounded such that interference of the local data signal for the PCC path on the external data signal for the SCC path is eliminated.

In one example, the PCC path and the SCC path includes a transmission sub-path and a reception sub-path, respectively. The transmission sub-path of the SCC path is controlled to be grounded such that interference of the local data signal for the PCC path on the external data signal for the SCC path is eliminated.

In another embodiment, the circuit further includes a switch. The switch includes a switch-control terminal connected to the transceiver module, a switch-input terminal connected to the transmission sub-path of the SCC path, and a switch-output terminal connected to ground. The switch is controlled to be turned on by the transceiver module such that the transmission sub-path of the SCC path is grounded.

In one example, the transceiver module includes an access point (AP), a RF transceiver chip, and a power amplifier. The AP is connected to the switch-control terminal of the switch. The RF transceiver chip is connected to the AP and connected to the front-end module via the reception sub-paths. The power amplifier is connected to the RF transceiver chip and connected to the front-end module via the transmission sub-paths.

In one example, the RF transceiver chip includes a signal-transmitting terminal, a PCC signal-receiving terminal, and a SCC signal-receiving terminal. The power amplifier includes a signal-input terminal, a PCC signal-output terminal, and a SCC signal-output terminal. The signal-transmitting terminal is connected to the signal-input terminal, the PCC signal-receiving terminal and the SCC signal-receiving terminal are connected to the front-end module via the respective reception sub-path, the PCC signal-output terminal and the SCC signal-output terminal are connected to the front-end module via the respective transmission sub-path.

In one example, the transmission sub-path and the reception sub-path of the PCC path are connected to the front-end module through a first duplexer. The transmission sub-path and the reception sub-path of the SCC path are connected to the front-end module through a second duplexer.

In one example, the front-end module includes an antenna and an antenna switcher. The antenna is configured to receive the external data signal and transmit the local data signal. The antenna switcher is connected to the antenna and configured for perform a switch operation on a frequency band of the antenna.

In one example, the antenna switcher is connected to the antenna through a frequency divider.

In one example, the switch is turned off such that the transmission sub-path of the SCC path is disconnected to ground when the RF control circuit perform a signal-transmitting and/or signal-receiving process via the SCC path or the PCC path. The switch is turned on such that the transmission sub-path of the SCC path is connected to ground when the RF control circuit perform a signal-transmitting and/or signal-receiving process via both the SCC path and the PCC path simultaneously.

In another embodiment, an RF control circuit is provided. The RF control circuit includes a primary component carrier (PCC) path and a secondary component carrier (SCC) path. The primary component carrier (PCC) path is connected to a transceiver module and a front-end module, respectively. The secondary component carrier (SCC) path is connected to the transceiver module and the front-end module, respectively. The front-end module is configured to receive an external data signal and transmit a local data signal, and the transceiver module is configured to receive a PCC signal from the external data signal and transmitting the PCC signal from the local data signal through the PCC path and receiving a SCC signal from the external data signal and transmitting the SCC signal from the local data signal through the SCC path. The SCC path is controlled to be grounded such that interference of the local data signal for the PCC path on the external data signal for the SCC path is eliminated.

In one example, the PCC path and the SCC path includes a transmission sub-path and a reception sub-path, respectively, wherein the transmission sub-path of the SCC path is controlled to be grounded such that interference of the local data signal for the PCC path on the external data signal for the SCC path is eliminated.

In one example, the RF control circuit further includes a switch. The switch includes a switch-control terminal connected to the transceiver module, a switch-input terminal connected to the transmission sub-path of the SCC path, and a switch-output terminal connected to ground. The switch is controlled to be turned on by the transceiver module such that the transmission sub-path of the SCC path is grounded.

In one example, the switch is turned off such that the sub-path transmission of the SCC path is disconnected to ground when the RF control circuit perform a signal-transmitting and/or signal-receiving process via the SCC path or the PCC path. The switch is turned on such that the transmission sub-path of the SCC path is connected to ground when the RF control circuit perform a signal-transmitting and/or signal-receiving process via both the SCC path and the PCC path simultaneously.

In one example, the transceiver module includes an access point (AP), RF transceiver chip, and a power amplifier. The AP is connected to the switch-control terminal of the switch. The RF transceiver chip is connected to the AP and connected to the front-end module via the reception sub-paths. The power amplifier is connected to the RF transceiver chip and connected to the front-end module via the transmission sub-paths.

In one example, the RF transceiver chip includes a signal-transmitting terminal, a PCC signal-receiving terminal, and a SCC signal-receiving terminal. The power amplifier includes a signal-input terminal, a PCC signal-output terminal, and a SCC signal-output terminal. The signal-transmitting terminal is connected to the signal-input terminal, the PCC signal-receiving terminal and the SCC signal-receiving terminal are connected to the front-end module via the respective reception sub-path, the PCC signal-output terminal and the SCC signal-output terminal are connected to the front-end module via the respective transmission sub-path.

In one example, the transmission sub-path and the reception sub-path of the PCC path are connected to the front-end module through a first duplexer. The transmission sub-path and the reception sub-path of the SCC path are connected to the front-end module through a second duplexer.

In one example, the front-end module includes an antenna and an antenna switcher. The antenna is configured to receive the external data signal and transmit the local data signal. The antenna switcher is connected to the antenna and configured for perform a switch operation on a frequency band of the antenna.

In one example, the antenna switcher is connected to the antenna through a frequency divider.

In another embodiment, A mobile terminal is provided. The mobile terminal includes a radio frequency (RF) control circuit. The circuit includes a transceiver module and a front-end module. The front-end module is connected to the transceiver module via a primary component carrier (PCC) path and a secondary component carrier (SCC) path, and is configured to receive an external data signal and transmit a local data signal. The transceiver module is configured to receive a PCC signal from the external data signal and transmit the PCC signal from the local data signal through the PCC path and receive a SCC signal from the external data signal and transmit the SCC signal from the local data signal through the SCC path. The SCC path is controlled to be grounded such that interference of the local data signal for the PCC path on the external data signal for the SCC path is eliminated.

In one example, the PCC path and the SCC path includes a transmission sub-path and a reception sub-path, respectively, wherein the transmission sub-path of the SCC path is controlled to be grounded such that interference of the local data signal for the PCC path on the external data signal for the SCC path is eliminated.

An operation control method of a terminal according to an embodiment of the present application may be implemented in an operation control apparatus of the terminal according to an embodiment of the present application, or a mobile terminal integrated with the operation control apparatus of the terminal (such as a notebook, a tablet, a mobile phone, wearable device, etc.). The operation control apparatus of the terminal can be implemented by hardware or software.

Referring to FIG. 1, FIG. 1 is a schematic diagram of a radio frequency (RF) control circuit 20 according to an embodiment of the present application. The RF control circuit 20 includes a transceiver module 21, a primary component carrier (PCC) path 22a, a secondary component carrier (SCC) path 22b, a front-end module 23, and a switch 24. The front-end module 23 is connected to the transceiver module 21 via the PCC path 22a and the SCC path 22b.

In one embodiment, the transceiver module 21 is configured to transmit a PCC signal of a local data signal and receive a PCC signal of an external data signal through the PCC path 22a, and transmit a SCC signal of the local data signal and receive a SCC signal of the external data signal through the SCC path 22b.

In one embodiment, the front-end module 23 is configured to receive the external data signal and transmit the local data signal.

In one embodiment, the SCC path is controlled to be grounded such that interference of the local data signal for the PCC path on the external data signal for the SCC path is eliminated.

Figure 2:
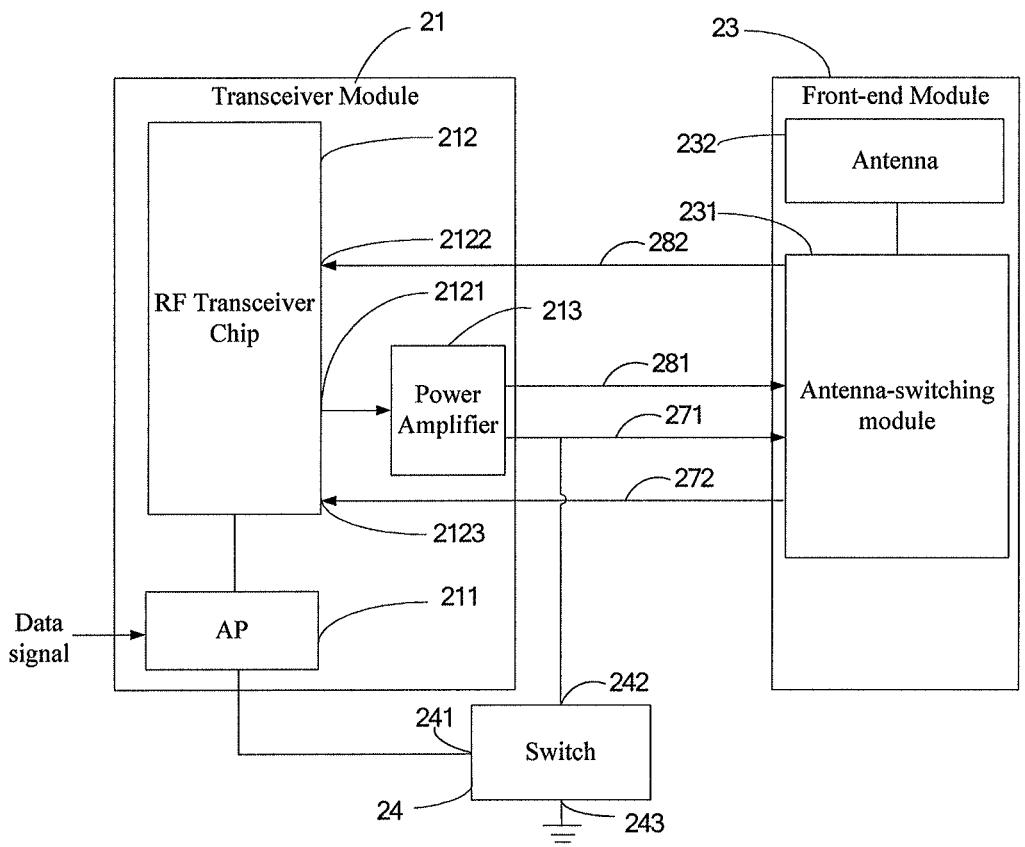
FIG. 2 is a partial schematic diagram of the RF control circuit shown in FIG. 1.

Referring to FIG. 2 together, FIG. 2 is a partial schematic diagram of the RF control circuit shown in FIG. 1. In one embodiment, the switch 24 includes a switch-control terminal 241 connected to the transceiver module 21, a switch-input terminal 242 connected to the transmission sub-path of the SCC path, and a switch-output terminal 243 connected to the ground.

In one embodiment, the transceiver module 21 includes an access point (AP) 211, a RF transceiver chip 212, and a power amplifier 213.

The AP 211 is configured to transmit the local data signal to the RF transceiver chip 212 and receive the external data signal from the RF transceiver chip 212.

The RF transceiver chip 212 is configured to transmit and receive PCC signals through the PCC path, and transmit and receive SCC signals through the SCC path. The RF transceiver chip 212 includes a signal-transmitting terminal 2121, a PCC signal-receiving terminal 2122, and a SCC signal-receiving terminal 2123. The signal-transmitting terminal 2121 of the RF transceiver chip 212 is connected to the power amplifier 213. The PCC signal-receiving terminal 2122 of the RF transceiver chip 212 is connected to the front-end module 23. The SCC signal-receiving terminal 2123 of the RF transceiver chip 212 is connected to the front-end module 23. The switch-control terminal of the switch 24 is connected to the AP 211.

In one embodiment, the power amplifier 213 is disposed between the RF transceiver chip 212 and the front-end module 23. The power amplifier 213 is configured for amplifying the local data signal.

In one embodiment, The PCC path 22a includes a transmission sub-path 281 and a reception sub-path 282, and the SCC path 22b includes a transmission sub-path 271 and a reception sub-path 272. The transmission sub-path 271 of the SCC path 22b is controlled to be grounded such that interference of the local data signal for the PCC path 22a on the external data signal for the SCC path 22b is eliminated.

The front-end module 23 includes an antenna switcher 231 and an antenna 232. The antenna switcher 231 is connected to the antenna 232, the power amplifier 213, and the RF transceiver chip 212, respectively. The antenna switcher 231 is configured for performing a switch operation on operating frequency bands of the antenna 232. The antenna 232 is configured to receive the external data signal and transmit the local data signal.

When the RF control circuit 20 operates in this embodiment, the AP 211 (e.g., a modem) transmits local data signals to the RF transceiver chip 212, and the RF transceiver chip 212 transmits the local data signals to the power amplifier 213 through the signal-transmitting terminal 2121. The power amplifier 213 transmits the amplified local data signal in the PCC frequency band and the amplified local data signal in the SCC frequency band to the antenna switcher 231, and then the antenna switcher 231 transmits the local data signals through the antenna 232.

When a receiving-signal process is performed on both the SCC path 22b and the PCC path 22a simultaneously, the antenna 232 receives external data signals and transmits the external data signals to the antenna switcher 231. The external data signal in the PCC frequency band and the external data signal in the SCC frequency band are then transmitted to the RF transceiver chip 212 through the PCC signal-receiving terminal 2122 and the SCC signal-receiving terminal 2123, respectively. Finally, the RF transceiver chip 212 transmits the external data signal in the SCC frequency band to a corresponding receiver through the AP 211. In this way, the transmitting operation of the local data signals in PCC frequency band and the receiving operation of the external data signals in PCC frequency band and the SCC frequency band may be implemented.

If interference harmonics are generated from the PCC on the transmission sub-path 281 of the PCC path 22a, the transmission sub-path 271 of the SCC path 22b is grounded through the switch-output terminal 243 of the switch 24. The interference harmonics cannot be coupled to the reception sub-path 272 of the SCC path 22a through the transmission sub-path 271 of the SCC path 22b. Therefore, it can be ensured that the received external data signal in the PCC frequency band and the external data signal in the SCC frequency band are not mutually interfered.

Figure 3:
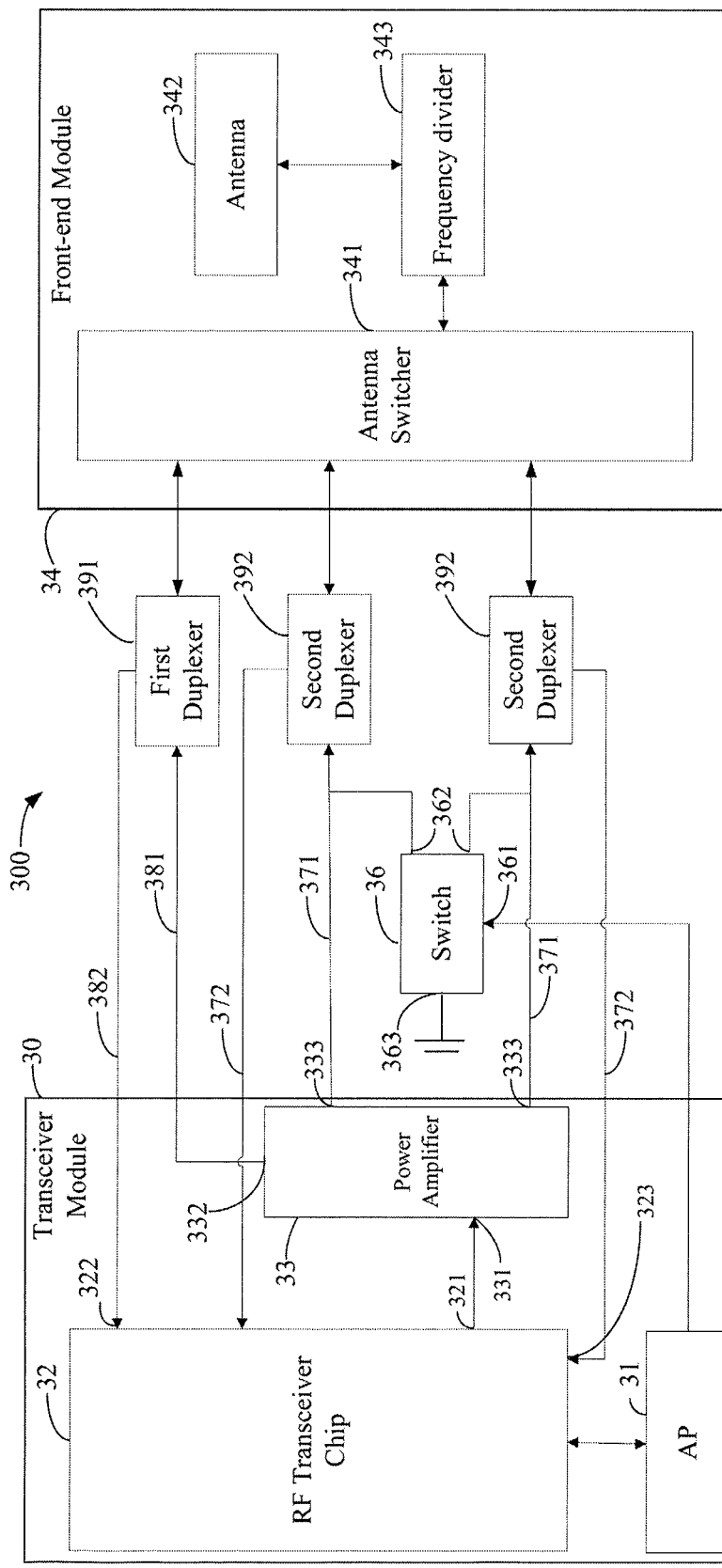
FIG. 3 is a schematic diagram of another RF control circuit according to another embodiment of the present application.

In specific, referring to FIG. 3, FIG. 3 is a schematic diagram of a RF control circuit according to another embodiment of the present application. In this embodiment, the RF control circuit 300 includes a transceiver module 30, a front-end module 34, and a switch 36. In one embodiment, the transceiver module 30 includes an AP 31, a RF transceiver chip 32, and a power amplifier 33. The front-end module 34 includes an antenna switcher 341 and an antenna 342.

In one embodiment, the AP 31 is connected to the RF transceiver chip 32. The AP 31 is configured to transmit a local data signal to the RF transceiver chip 32 and receive an external data signal from the RF transceiver chip 32.

The RF transceiver chip 32 is configured to transmit and receive a PCC signal through a PCC path and to transmit and receive a SCC signal through a SCC path. The RF transceiver chip 32 includes a signal-transmitting terminal 321, a PCC signal-receiving terminal 322, and a SCC signal-receiving terminal 323.

The power amplifier 33 is connected to the signal-transmitting terminal 321 and the antenna switcher 341, respectively. The power amplifier 33 is configured for performing an amplification processing on the local data signal. In one embodiment, the power amplifier 33 is a multimode multi-band power amplifier.

The power amplifier 33 includes a signal-input terminal 331 for inputting the PCC signal and the SCC signal, a PCC signal-output terminal 332, and a SCC signal-output terminal 333. The signal-input terminal 331 of the power amplifier 33 is connected to the signal-transmitting terminal 321 of the RF transceiver chip 32. The PCC signal-output terminal 332 of the power amplifier 33 is connected to the antenna switcher 341 via a transmission sub-path 381 of the PCC path. The SCC signal-output terminal 333 of the power amplifier 33 is connected to the antenna switcher 341 via the transmission sub-path 371 of the SCC path.

The PCC path includes the transmission sub-path 381 and a reception sub-path 382. The transmission sub-path 381 and the reception sub-path 382 of the PCC path are connected to the antenna switcher 341 via a first duplexer 391. The SCC path includes the transmission sub-path 371 and a reception sub-path 372. The transmission sub-path 371 and the reception sub-path 372 of the SCC path are connected to the antenna switcher 341 via a second duplexer 392.

The antenna switcher 341 is connected to the antenna 342. The antenna switcher 341 is used to perform a switch operation on the operating frequency bands of the antenna 342. The antenna 342 is configured to receive an external data signal and transmit a local data signal. In one embodiment, the antenna switcher 341 is connected to the antenna through a frequency divider 343.

The switch 36 includes a switch-control terminal 361, a switch-input terminal 362, and a switch-output terminal 363. In one embodiment, the switch-control terminal 361 is connected to the AP 31. The switch-input terminal 362 is connected to the transmission sub-path 371 of the SCC path. The switch-output terminal 363 is grounded.

In one embodiment, the SCC signal-receiving terminal 323 of the RF transceiver chip 32 is connected to the reception sub-path 372 of the SCC path. The PCC signal-receiving terminal 322 of the RF transceiver chip 32 is connected to the reception sub-path 382 of the PCC path.

It can be noted that the RF transceiver chip 32 of the RF control circuit in this embodiment may include a first SCC signal-receiving terminal and a second SCC signal-receiving terminal, which are used for the SCC signals in different frequency bands. The power amplifier 33 includes a first SCC signal-output terminal and a second SCC signal-output terminal, which are used for the SCC signals in different frequency bands. The first SCC signal-output terminal of the power amplifier 33 corresponds to the first SCC signal-receiving terminal of the RF transceiver chip 32, and the second SCC signal-output terminal of the power amplifier 33 corresponds to the second SCC signal-receiving terminal of the RF transceiver chip 32.

When the RF control circuit 300 in this embodiment operates, the switch 36 is in an off state when a signal-transmitting process is performed on the SCC path separately, and the transmission sub-path 371 of the SCC path is disconnected from the ground. The AP 31 (e.g., a modem) transmits the local data signals to the RF transceiver chip 32. The RF transceiver chip 32 transmits the local data signals to the power amplifier 33 through the signal-transmitting terminal 321. The power amplifier 33 then transmits the amplified local data signals in the SCC frequency band to the antenna switcher 341 through the SCC signal-output terminal 333, the transmission sub-path 371 of the SCC path, and the second duplexer 392. The antenna switcher 341 then transmits the local data signals through the antenna 342.

When a signal-receiving process is performed on the SCC path separately, the switch 36 is in an off state, and the transmission sub-path 371 of the SCC path is disconnected from the ground. At this time, the antenna 342 receives the external data signals and transmits them to the antenna switcher 341. The external data signals are then transmitted to the RF transceiver chip 32 through the second duplexer 392, the reception sup-path 372 of the SCC path, and the SCC signal-receiving terminal 323. Finally, the RF transceiver chip 32 transmits the external data signals to a corresponding receiver through the AP 31.

When a signal-transmitting process is performed on the PCC path separately, the switch 36 is in the off state, and the transmission sub-path 371 of the SCC path is disconnected from the ground. The AP 31 transmits the local data signals to the RF transceiver chip 32. The RF transceiver chip 32 then transmits the local data signals to the power amplifier 33 through the signal-transmitting terminal 321. The power amplifier 33 then transmits the amplified local data signal in the PCC frequency band to the antenna switcher 341 through the PCC signal-output terminal 332, the transmission sub-path 381 of the PCC path, and the first duplexer 391. The antenna switcher 341 then transmits the local data signals through the antenna 342.

When a signal-receiving process is performed on the PCC path separately, the switch 36 is in the off state, and the transmission sub-path 371 of the SCC path is disconnected from the ground. The antenna 342 receives the external data signals and transmits them to the antenna switcher 341. The external data signals are then transmitted to the RF transceiver chip 32 through the first duplexer 391, the reception sup-path 382 of the PCC path, and the PCC signal-receiving terminal 322. Finally, the RF transceiver chip 32 transmits the external data signals to a corresponding receiver through the AP 31.

When a signal-transmitting process is performed on both the SCC path and the PCC path simultaneously, the switch 36 is turned on, and then the transmission sub-path 371 of the SCC path is grounded. The AP 31 transmits the local data signals to the RF transceiver chip 32. The RF transceiver chip 32 transmits the local data signals to the power amplifier 33 through the signal-transmitting terminal 321. The power amplifier 33 then transmits the amplified local data signals in the SCC frequency band through the SCC signal-output terminal 333, the transmission sub-path 371 of the SCC path, and the switch 36 to the ground. At the same time, the power amplifier 33 transmits the amplified local data signals in the PCC frequency band to the antenna switcher 341 through the PCC signal-output terminal 332, the transmission sub-path 381 of the PCC path, and the first duplexer 391. The antenna switcher 341 then transmits the local data signals in the PCC frequency band through the antenna 342.

When a signal-receiving process is performed on the SCC path and the PCC path simultaneously, the switch 36 is turned on, and then the transmission sub-path 371 of the SCC path is grounded. The antenna 342 receives the external data signals and transmits them to the antenna switcher 341. The external data signals in the SCC frequency band are then transmitted to the RF transceiver chip 32 through the second duplexer 392, the reception sub-path 372 of the SCC path, and the SCC signal-receiving terminal 323. Finally, the RF transceiver chip 32 transmits the external data signals in the SCC frequency band to a corresponding receiver through the AP 31. At the same time, the external data signals in the PCC frequency band are transmitted to the RF transceiver chip 32 through the first duplexer 391, the reception sup-path 382 of the PCC path, and the PCC signal-receiving terminal 322. Finally, the RF transceiver chip 32 transmits the external data signal in the PCC frequency band to a corresponding receiver through the AP 31. In this way, the transmitting operation of the local data signal in the PCC frequency band and the receiving operations of the external data signal in the PCC frequency band and the SCC frequency band are realized.

If interference harmonics are generated from the PCC on the transmission sub-path 381 of the PCC path, the interference harmonic cannot be coupled to the reception sup-path 372 of the SCC path through the transmission sub-path 371 of the SCC path since the transmission sub-path 371 of the SCC path is grounded Therefore, it can be ensured that the received external data signal in the PCC frequency band and the external data signal in the SCC frequency band are not mutually interfered.

Thus, the signal-receiving and signal-transmitting processes of the RF control circuit 300 in this embodiment may be completed.

The RF control circuit provided in this embodiment prevents the harmonics of the PCC signal affecting the receiving operation of the SCC signal due to the specific setting of the switch, which improves the stability and transmission performance of the antenna of the mobile terminal.

Figure 4:
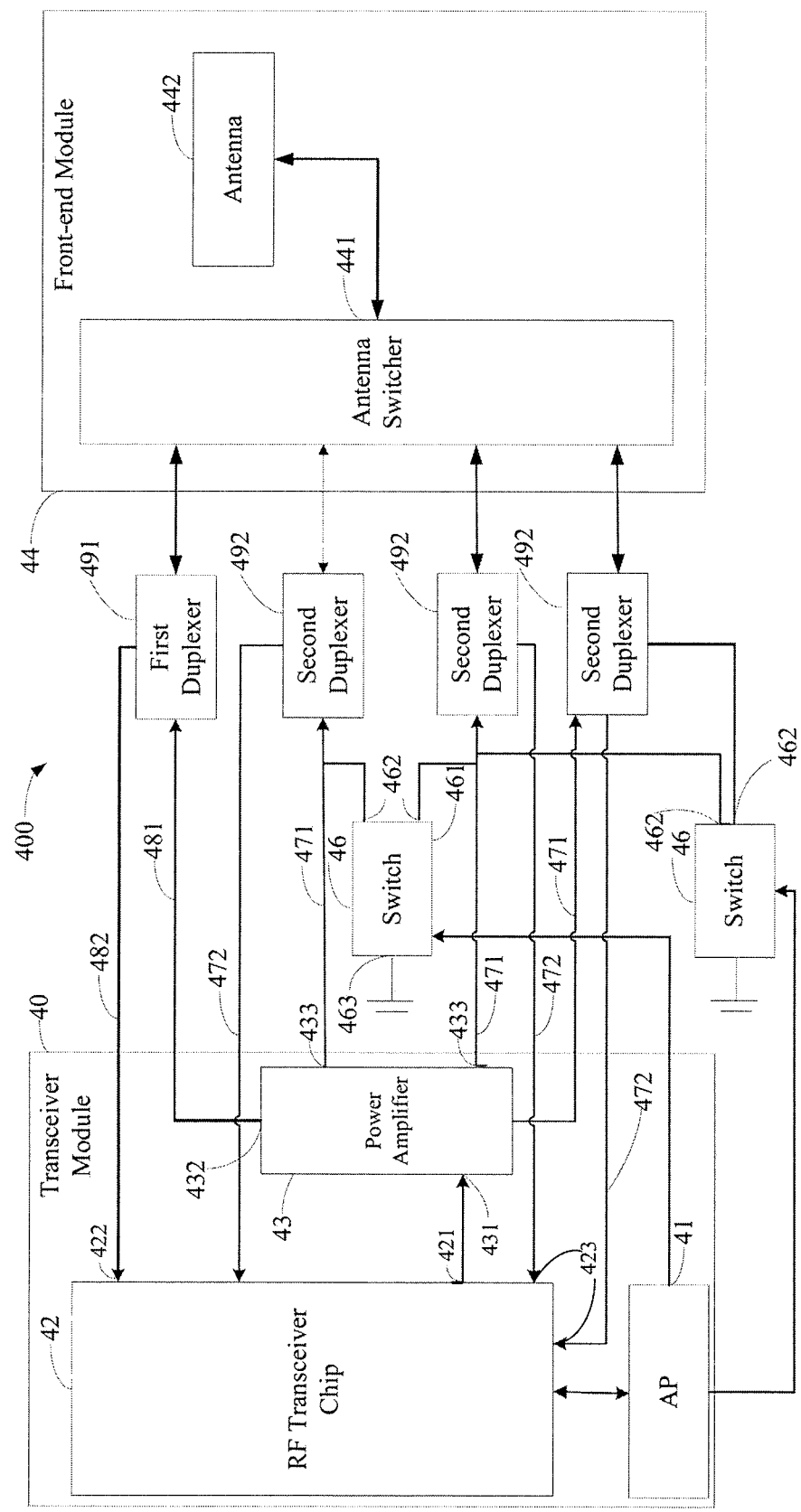
FIG. 4 is a schematic diagram of still another RF control circuit according to yet another embodiment of the present application.

It should be noted that, in other embodiments, if there are multiple SCC paths, the specific principle of each SCC path is the same as above. Referring to FIG. 4 together, FIG. 4 is still another schematic diagram of a RF control circuit 400 in the present application. When a plurality of SCC paths are provided, a switch 46 may be disposed between adjacent SCC paths to prevent the influence of the harmonics of the PCC signal on the received data of the SCC signals. The front-end module 44 only includes an antenna switcher 441 and an antenna 442 directly connected to the antenna switcher.

In one embodiment, the RF control circuit 400 includes a transceiver module 40, a front-end module 44, and a switch 46. In one embodiment, the transceiver module 40 includes an AP 41, a RF transceiver chip 42, and a power amplifier 43. The front-end module 44 includes an antenna switcher 441 and an antenna 442.

In one embodiment, the AP 41 is connected to the RF transceiver chip 42. The AP 41 is configured to transmit a local data signal to the RF transceiver chip 42 and receive an external data signal from the RF transceiver chip 42.

The RF transceiver chip 42 is configured to transmit and receive a PCC signal through a PCC path and to transmit and receive a SCC signal through a SCC path. The RF transceiver chip 42 includes a signal-transmitting terminal 421, a PCC signal-receiving terminal 422, and SCC signal-receiving terminals 423.

The power amplifier 43 is connected to the signal-transmitting terminal 421 and the antenna switcher 441, respectively. The power amplifier 43 is configured for performing an amplification processing on the local data signal. In one embodiment, the power amplifier 43 is a multimode multi-band power amplifier.

The power amplifier 43 includes a signal-input terminal 431 for inputting the PCC signal and the SCC signal, a PCC signal-output terminal 432, and a SCC signal-output terminal 433. The signal-input terminal 431 of the power amplifier 43 is connected to the signal-transmitting terminal 421 of the RF transceiver chip 42. The PCC signal-output terminal 432 of the power amplifier 43 is connected to the antenna switcher 441 via a transmission sub-path 481 of the PCC path. The SCC signal-output terminal 433 of the power amplifier 43 is connected to the antenna switcher 441 via the transmission sub-path 471 of the SCC path.

The PCC path includes the transmission sub-path 481 and a reception sub-path 482. The transmission sub-path 481 and the reception sub-path 482 of the PCC path are connected to the antenna switcher 441 via a first duplexer 491. The SCC path includes the transmission sub-path 471 and a reception sub-path 472. The transmission sub-path 471 and the reception sub-path 472 of the SCC path are connected to the antenna switcher 441 via a second duplexer 492.

The antenna switcher 441 is connected to the antenna 442. The antenna switcher 441 is used to perform a switch operation on the operating frequency bands of the antenna 442. The antenna 442 is configured to receive an external data signal and transmit a local data signal.

The switch 46 includes a switch-control terminal 461, a switch-input terminal 462, and a switch-output terminal 463. In one embodiment, the switch-control terminal 461 is connected to the AP 41. The switch-input terminal 462 is connected to the transmission sub-path 471 of the SCC path. The switch-output terminal 463 is grounded.

In one embodiment, the SCC signal-receiving terminal 423 of the RF transceiver chip 42 is connected to the reception sub-path 472 of the SCC path. The PCC signal-receiving terminal 422 of the RF transceiver chip 42 is connected to the reception sub-path 482 of the PCC path.

It should be noted that the RF transceiver chip 42 of the RF control circuit in this embodiment may include a first SCC signal-receiving terminal and a second SCC signal-receiving terminal, which are used for the SCC signals in different frequency bands. The power amplifier 43 includes a first SCC signal-output terminal and a second SCC signal-output terminal, which are used for the SCC signals in different frequency bands. The first SCC signal-output terminal of the power amplifier 43 corresponds to the first SCC signal-receiving terminal of the RF transceiver chip 42, and the second SCC signal-output terminal of the power amplifier 43 corresponds to the second SCC signal-receiving terminal of the RF transceiver chip 42.

When the RF control circuit 400 in this embodiment operates, the switch 46 is in an off state when a signal-transmitting process is performed on the SCC path separately, and the transmission sub-path 471 of the SCC path is disconnected from the ground. The AP 41 (e.g., a modem) transmits the local data signals to the RF transceiver chip 42. The RF transceiver chip 42 transmits the local data signals to the power amplifier 43 through the signal-transmitting terminal 421. The power amplifier 43 then transmits the amplified local data signals in the SCC frequency band to the antenna switcher 441 through the SCC signal-output terminal 433, the transmission sub-path 471 of the SCC path, and the second duplexer 492. The antenna switcher 441 then transmits the local data signals through the antenna 442.

When a signal-receiving process is performed on the SCC path separately, the switch 46 is in an off state, and the transmission sub-path 471 of the SCC path is disconnected from the ground. At this time, the antenna 442 receives the external data signals and transmits them to the antenna switcher 441. The external data signals are then transmitted to the RF transceiver chip 42 through the second duplexer 492, the reception sub-path 472 of the SCC path, and the SCC signal-receiving terminal 423. Finally, the RF transceiver chip 42 transmits the external data signals to a corresponding receiver through the AP 41.

When a signal-transmitting process is performed on the PCC path separately, the switch 46 is in the off state, and the transmission sub-path 471 of the SCC path is disconnected from the ground. The AP 41 transmits the local data signals to the RF transceiver chip 42. The RF transceiver chip 42 then transmits the local data signals to the power amplifier 43 through the signal-transmitting terminal 421. The power amplifier 43 then transmits the amplified local data signal in the PCC frequency band to the antenna switcher 441 through the PCC signal-output terminal 432, the transmission sub-path 481 of the PCC path, and the first duplexer 491. The antenna switcher 441 then transmits the local data signals through the antenna 442.

When a signal-receiving process is performed on the PCC path separately, the switch 46 is in the off state, and the transmission sub-path 471 of the SCC path is disconnected from the ground. The antenna 442 receives the external data signals and transmits them to the antenna switcher 441. The external data signals are then transmitted to the RF transceiver chip 42 through the first duplexer 491, the reception sub-path 482 of the PCC path, and the PCC signal-receiving terminal 422. Finally, the RF transceiver chip 42 transmits the external data signals to a corresponding receiver through the AP 41.

When a signal-transmitting process is performed on both the SCC path and the PCC path simultaneously, the switch 46 is turned on, and then the transmission sub-path 471 of the SCC path is grounded. The AP 41 transmits the local data signals to the RF transceiver chip 42. The RF transceiver chip 42 transmits the local data signals to the power amplifier 43 through the signal-transmitting terminal 421. The power amplifier 43 then transmits the amplified local data signals in the SCC frequency band through the SCC signal-output terminal 433, the transmission sub-path 471 of the SCC path, and the switch 46 to the ground. At the same time, the power amplifier 43 transmits the amplified local data signals in the PCC frequency band to the antenna switcher 441 through the PCC signal-output terminal 432, the transmission sub-path 481 of the PCC path, and the first duplexer 491. The antenna switcher 441 then transmits the local data signals in the PCC frequency band through the antenna 442.

When a signal-receiving process is performed on the SCC path and the PCC path simultaneously, the switch 46 is turned on, and then the transmission sub-path 471 of the SCC path is grounded. The antenna 442 receives the external data signals and transmits them to the antenna switcher 441. The external data signals in the SCC frequency band are then transmitted to the RF transceiver chip 42 through the second duplexer 492, the reception sub-path 472 of the SCC path, and the SCC signal-receiving terminal 423. Finally, the RF transceiver chip 42 transmits the external data signals in the SCC frequency band to a corresponding receiver through the AP 41. At the same time, the external data signals in the PCC frequency band are transmitted to the RF transceiver chip 42 through the first duplexer 491, the reception sub-path 482 of the PCC path, and the PCC signal-receiving terminal 422. Finally, the RF transceiver chip 42 transmits the external data signal in the PCC frequency band to a corresponding receiver through the AP 41. In this way, the transmitting operation of the local data signal in the PCC frequency band and the receiving operations of the external data signal in the PCC frequency band and the SCC frequency band are realized.

If interference harmonics are generated from the PCC on the transmission sub-path 481 of the PCC path, the interference harmonic cannot be coupled to the reception sub-path 472 of the SCC path through the transmission sub-path 471 of the SCC path since the transmission sub-path 471 of the SCC path is grounded. Therefore, it can be ensured that the received external data signal in the PCC frequency band and the external data signal in the SCC frequency band are not mutually interfered.

Thus, the signal-receiving and signal-transmitting processes of the RF control circuit 400 in this embodiment may be completed.

The RF control circuit provided in this embodiment prevents the harmonics of the PCC signal affecting the receiving operation of the SCC signal due to the specific setting of the switch, which improves the stability and transmission performance of the antenna of the mobile terminal.

Figure 5:
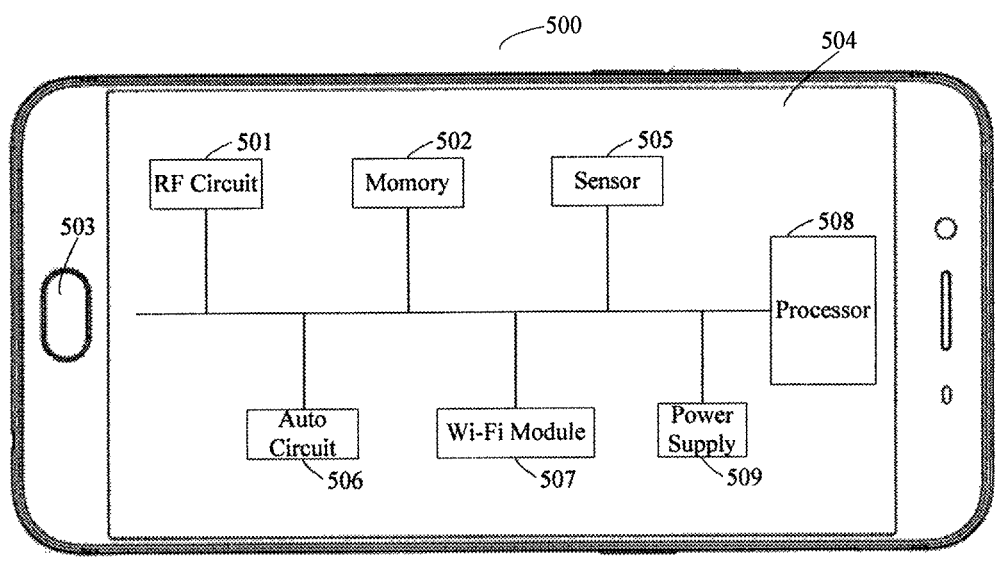
FIG. 5 is a schematic diagram of a terminal according to an embodiment of the present disclosure.

A terminal is provided in an embodiment of the present application. As shown in FIG. 5, the terminal 500 may include a radio frequency (RF) circuit 501, a memory 502 including one or more computer readable storage media, and an input unit 503, a display unit 504, a sensor 505, an audio circuit 506, the Wireless Fidelity (Wi-Fi) module 507, a processor 508 including one or more processing cores, a power supply 509, and the like. It will be understood by those skilled in the art, the terminal shown in FIG. 5 does not constitute a limitation to the terminal, and may include more or less components than those illustrated, or a combination of certain components, or different component arrangements.

The RF circuit 501 may be configured to receive and transmit information or signals during a communication process. In special, the RF circuit sends downlink information to one or more processor 508 to process after receiving the downlink information from a base station, and transmits uplink data to the base station. Generally, the RF circuit 501 includes, but is not limited to, an antenna, at least one amplifier, a tuner, one or more oscillators, a Subscriber Identity Module (SIM) card, a transceiver, a coupler, a low noise amplifier (LNA), a duplexer, etc. In addition, the RF circuit 501 may also communicate with other devices via wireless communication and a network. The wireless communication can use any communication standard or protocol, including but not limited to Global System of Mobile communication (GSM), General Packet Radio Service (GPRS), and Code Division Multiple Access (CDMA), Wideband Code Division Multiple Access (WCDMA), Long Term Evolution (LTE), e-mail, Short Messaging Service (SMS), and the like.

The Memory 502 can be used to store software programs as well as modules. The processor 508 executes various function applications and data processing by running the software programs and the modules stored in the memory 502. The memory 502 may mainly include a program storage region and a data storage region. The program storage region may store an operation system, application programs for at least one function (for example, an audio playing function, an image playing function, etc.). The data storage region may store data (for example, audio data, telephone directory, etc.) created according to use of the mobile phone. In addition, the memory 502 may include a high-speed RAM, and may further include a non-volatile memory, such as at least one of a disk storage device, a flash device, or other non-volatile solid storage devices. Accordingly, the memory 502 may also include a memory controller to provide access to memory 502 for the processor 508 and the input unit 503.

The input unit 503 may be configured to receive input numeric or character information and to produce a keyboard, a mouse, a joystick, an optical or trackball signal inputs related to users' settings and function controls. In particular, in one particular embodiment, the input unit 503 can include a touch-sensitive surface as well as other input devices. The touch panel, also named as touch screen, is configured to collect touch operations thereon or there-near (e.g., operations by any suitable object or accessory, such as users' fingers, a touch pen and the like, on the touch panel or near the touch panel), and drive corresponding connection devices according to preset programs. Optionally, the touch panel may include two parts: a touch detection apparatus and a touch controller. The touch detection apparatus detects a position where a user touches and a signal caused by the touch operation, and transmits the signal to the touch controller. The touch controller receives the signal from the touch detection apparatus, converts the signal into coordinates of a touch point, and then sends the coordinates to the processor 508. The touch controller may also receive and execute a command sent by the processor. In addition, the touch panel may be a resistive, capacitive, infrared, or surface acoustic wave touch panel. In addition to the touch-sensitive panel, the input unit 503 may also include other input devices. Specifically, the other input devices may include, but not limited to, one or more of a physical keyboard, a functional key (such as a volume control key and a switch key), a track ball, a mouse, an operating rod, etc.

The display unit 504 may be used to display information entered by the user or provided to the user, as well as various graphical user interfaces of the terminal. The graphical user interfaces may be composed of graphics, text, icons, video, and any combination thereof. The display unit 504 may include a display panel. Alternatively, the display panel is configured to be a Liquid Crystal Display (LCD) panel, an Organic Light-Emitting Diode (OLED) panel and the like. Further, the touch panel may cover the display panel. When the touch operation on or near the touch panel is detected, the touch operation is transmitted to the processor 508 to determine which a type of touch event. The processor may then provide a corresponding visual output on the display panel according to the type of the touch event. Although the touch-sensitive surface and display panel are implemented as two separate components to perform input and input functions in FIG. 5, the touch-sensitive surface can be integrated with the display panel to implement input and output functions in some embodiments.

The terminal may also include at least one of sensor 505, such as a light sensor, motion sensor, and other sensors. Specifically, the light sensor may include an ambient light sensor and a proximity sensor, wherein the ambient light sensor can adjust the brightness of the display panel according to the brightness of the ambient light, and the proximity sensor can close the display panel and/or the backlight when the terminal moves to the ear. As a motion sensor, the gravity acceleration sensor can detect the magnitude of acceleration in various directions (usually three axes). When it is stationary, it can detect the magnitude and direction of gravity. It can be used to identify the gesture of the mobile phone (e.g., horizontal and vertical screen switching, related game, magnetometer attitude calibration), vibration recognition related functions (e.g., pedometer, tapping) and the like. The terminal may also include other sensors such as gyroscopes, barometers, hygrometers, thermometers, and infrared sensors which may not be described herein.

The audio circuit 506 may provide an audio interface between the user and the terminal through speakers and microphones. The audio circuit 506 can convert the received audio data into an electrical signal, which is transmitted to the speaker. The speaker converts it into a sound signal output. On the other hand, the microphone converts the collected sound signal into an electrical signal, which is received by the audio circuit 506 and converted into the audio data. The audio data is then output to and processed by the processor 508, and then transmitted via the RF circuit 501 to, for example, another terminal. Or, the audio data is output to the memory 502 for further processing. The audio circuit 506 may also include an earbud jack to provide communication between the peripheral earphone and the terminal.

Wi-Fi is a short-range wireless transmission technology. The terminal with Wi-Fi module 507 may assist the user in E-mail receiving and sending, webpage browsing, access to streaming media and the like. The Wi-Fi provides a wireless wideband internet access for the user. Although the Wi-Fi module 507 is illustrated in FIG. 6, it can be understood that, it is not necessary to constitute the configuration of the terminal, and may be omitted as needed without changing the scope of the present application.

The processor 508 is a control center of the terminal and is configured to connect all parts of the terminal by utilizing various interfaces and lines. The processor run or execute software programs and/or modules stored in the memory 502 and call data stored in the memory 502 to execute various functions and processing data of the terminal. Thus, the terminal is monitored wholly. Optionally, the processor 508 may include one or more processing cores. In one embodiment, the processor may be integrated with an application processor and a modulation-demodulation processor. The application processor mainly processes an operation system, a user interface, an application program and the like, and the modulation-demodulation processor mainly processes wireless communication. It will be appreciated that the above described modulation-demodulation processor may also not be integrated into the processor 508.

The terminal also includes a power supply 509 (e.g., a battery) that supplies power to the various components. The power supply may be connected with the processor logically via a power supply management system. Functions such as charging, discharging, and power consumption management, may be implemented by the power supply management system. The power supply 509 may also include any one or more of a DC or AC power supply, a recharging system, a power failure detection circuit, a power converter or inverter, a power status indicator, and the like.

Specifically, in this embodiment, the RF circuit 501 is the RF control circuit described in the previous embodiments. The specific working principle of the mobile terminal of the present application is the same as or similar to the related description in the embodiments of the RF control circuit, which is described with reference to the related description in the embodiment of the RF control circuit.

The RF control circuit provided in this embodiment prevents the harmonics of the PCC signal affecting the receiving operation of the SCC signal due to the specific setting of the switch, which improves the stability and transmission performance of the antenna of the mobile terminal and solves technical problems that is poor stability or transmission performance in the antenna of the existing mobile terminal.

It should be noted that, those skilled in the art can understand that all or part of the steps of the foregoing embodiments can be completed by a program to instruct related hardware, and the program can be stored in a computer readable storage medium. The storage medium may include a read only memory (ROM), a random access memory (RAM), a magnetic disk or an optical disk, and the like.

The RF control circuit and the mobile terminal provided by the embodiments of the present application are described in detail. The principles and implementation manners of the present application are described in the specific examples. The description of the above embodiments is only used to help understand a method and a core idea of the present application. At the same time, for those skilled in the art, according to the idea of the present application, there will be changes in the specific embodiment and the scope of application. In summary, the content of the specification should not be understood as limitations of the present application.

What is claimed is:

1. A radio frequency (RF) control circuit, comprising:
    a transceiver module;
    a front-end module connected to the transceiver module via a primary component carrier (PCC) path and a secondary component carrier (SCC) path, configured to receive an external data signal and transmit a local data signal; wherein each of the PCC path and the SCC path comprises a transmission sub-path;
    a switch connected to the transceiver module, the transmission sub-path of the SCC path, and ground;
    wherein the transceiver module is configured to receive a PCC signal from the external data signal and transmit the PCC signal from the local data signal through the PCC path and receive a SCC signal from the external data signal and transmit the SCC signal from the local data signal through the SCC path; and
    when the SCC path or the PCC path operates separately, the transmission sub-path of the SCC path is disconnected to the ground by turning off a working mode switching switch;
    when the SCC path and the PCC path operate simultaneously, the transmission sub-path of the SCC path is connected to the ground by turning on the working mode switching switch.

2. The RF control circuit according to claim 1, wherein each of the PCC path and the SCC path further comprises a reception sub-path.

3. The RF control circuit according to claim 2, where the switch comprises a switch-control terminal connected to the transceiver module, a switch-input terminal connected to the transmission sub-path of the SCC path, and a switch-output terminal connected to ground;
    wherein the transmission sub-path of the SCC path is grounded via the switch is controlled to be turned on by the transceiver module.

4. The RF control circuit according to claim 3, wherein the transceiver module comprises:
    an access point (AP), connected to the switch-control terminal of the switch;
    a RF transceiver chip, connected to the AP and connected to the front-end module via the reception sub-paths; and
    a power amplifier, connected to the RF transceiver chip and connected to the front-end module via the transmission sub-paths.

5. The RF control circuit according to claim 4, wherein the RF transceiver chip comprises a signal-transmitting terminal, a PCC signal-receiving terminal, and a SCC signal-receiving terminal;
    the power amplifier comprises a signal-input terminal, a PCC signal-output terminal, and a SCC signal-output terminal; and
    the signal-transmitting terminal is connected to the signal-input terminal, the PCC signal-receiving terminal and the SCC signal-receiving terminal are connected to the front-end module via the respective reception sub-path, the PCC signal-output terminal and the SCC signal-output terminal are connected to the front-end module via the respective transmission sub-path.

6. The RF control circuit according to claim 5, wherein the transmission sub-path and the reception sub-path of the PCC path are connected to the front-end module through a first duplexer; and
    the transmission sub-path and the reception sub-path of the SCC path are connected to the front-end module through a second duplexer.

7. The RF control circuit according to claim 6, wherein the front-end module comprises:
    an antenna, configured to receive the external data signal and transmit the local data signal; and
    an antenna switcher, connected to the antenna and configured for perform a switch operation on a frequency band of the antenna.

8. The RF control circuit according to claim 7, wherein the antenna switcher is connected to the antenna through a frequency divider.

9. The RF control circuit according to claim 8, wherein when a signal-transmitting process is performed on both the SCC path and the PCC path simultaneously, the AP transmits the local data signals to the RF transceiver chip; the RF transceiver chip transmits the local data signals to the power amplifier through a signal-transmitting terminal; the power amplifier then transmits amplified local data signals in a SCC frequency band to the ground through the SCC signal-output terminal, the transmission sub-path of the SCC path, and the working mode switching switch; at the same time, the power amplifier transmits amplified local data signals in a PCC frequency band to the front-end module through the PCC signal-output terminal, the transmission sub-path of the PCC path, and the front-end module then transmits the amplified local data signals in the PCC frequency band.

10. An RF control circuit, comprising:
a primary component carrier (PCC) path, connected to a transceiver module and a front-end module, respectively;
a secondary component carrier (SCC) path, connected to the transceiver module and the front-end module, respectively, wherein each of the PCC path and the SCC path comprises a transmission sub-path; and
a switch connected to the transceiver module, the transmission sub-path of the SCC path, and ground;
wherein the front-end module is configured to receive an external data signal and transmit a local data signal, and the transceiver module is configured to receive a PCC signal from the external data signal and transmitting the PCC signal from the local data signal through the PCC path and receiving a SCC signal from the external data signal and transmitting the SCC signal from the local data signal through the SCC path; and
when the SCC path or the PCC path operates separately, the transmission sub-path of the SCC path is disconnected to the ground by turning off a working mode switching switch;
when the SCC path and the PCC path operate simultaneously, the transmission sub-path of the SCC path is connected to the ground by turning on the working mode switching switch.

11. The RF control circuit according to claim 10, wherein each of the PCC path and the SCC path further comprises a reception sub-path.

12. The RF control circuit according to claim 11, where the switch comprises a switch-control terminal connected to the transceiver module, a switch-input terminal connected to the transmission sub-path of the SCC path, and a switch-output terminal connected to ground;
wherein the transmission sub-path of the SCC path is grounded via the switch is controlled to be turned on by the transceiver module.

13. The RF control circuit according to claim 12, wherein the transceiver module comprises:
an access point (AP), connected to the switch-control terminal of the switch;
a RF transceiver chip, connected to the AP and connected to the front-end module via the reception sub-paths; and
a power amplifier, connected to the RF transceiver chip and connected to the front-end module via the transmission sub-paths.

14. The RF control circuit according to claim 13, wherein the RF transceiver chip comprises a signal-transmitting terminal, a PCC signal-receiving terminal, and a SCC signal-receiving terminal;
the power amplifier comprises a signal-input terminal, a PCC signal-output terminal, and a SCC signal-output terminal; and
the signal-transmitting terminal is connected to the signal-input terminal, the PCC signal-receiving terminal and the SCC signal-receiving terminal are connected to the front-end module via the respective reception sub-path, the PCC signal-output terminal and the SCC signal-output terminal are connected to the front-end module via the respective transmission sub-path.

15. The RF control circuit according to claim 14, wherein the transmission sub-path and the reception sub-path of the PCC path are connected to the front-end module through a first duplexer; and
the transmission sub-path and the reception sub-path of the SCC path are connected to the front-end module through a second duplexer.

16. The RF control circuit according to claim 15, wherein the front-end module comprises:
an antenna, configured to receive the external data signal and transmit the local data signal; and
an antenna switcher, connected to the antenna and configured for perform a switch operation on a frequency band of the antenna.

17. The RF control circuit according to claim 16, wherein the antenna switcher is connected to the antenna through a frequency divider.

18. The RF control circuit according to claim 17, wherein when a signal-transmitting process is performed on both the SCC path and the PCC path simultaneously, the AP transmits the local data signals to the RF transceiver chip; the RF transceiver chip transmits the local data signals to the power amplifier through a signal-transmitting terminal; the power amplifier then transmits amplified local data signals in a SCC frequency band to the ground through the SCC signal-output terminal, the transmission sub-path of the SCC path, and the working mode switching switch; at the same time, the power amplifier transmits amplified local data signals in a PCC frequency band to the front-end module through the PCC signal-output terminal, the transmission sub-path of the PCC path, and the front-end module then transmits the amplified local data signals in the PCC frequency band.

19. A mobile terminal, comprising:
a radio frequency (RF) control circuit, comprising:
a transceiver module;
a front-end module connected to the transceiver module via a primary component carrier (PCC) path and a secondary component carrier (SCC) path, configured to receive an external data signal and transmit a local data signal; wherein each of the PCC path and the SCC path comprises a transmission sub-path; and
a switch connected to the transceiver module, the transmission sub-path of the SCC path, and ground;
wherein the transceiver module is configured to receive a PCC signal from the external data signal and transmit the PCC signal from the local data signal through the PCC path and receive a SCC signal from the external data signal and transmit the SCC signal from the local data signal through the SCC path; and
when the SCC path or the PCC path operates separately, the transmission sub-path of the SCC path is disconnected to the ground by turning off a working mode switching switch;
when the SCC path and the PCC path operate simultaneously, the transmission sub-path of the SCC path is connected to the ground by turning on the working mode switching switch.

20. The mobile terminal according to claim 19, wherein when a signal-transmitting process is performed on both the SCC path and the PCC path simultaneously, the AP transmits the local data signals to the RF transceiver chip; the RF transceiver chip transmits the local data signals to the power amplifier through a signal-transmitting terminal; the power amplifier then transmits amplified local data signals in a SCC frequency band to the ground through the SCC signal-output terminal, the transmission sub-path of the SCC path, and the working mode switching switch; at the same time, the power amplifier transmits amplified local data signals in a PCC frequency band to the front-end module through the PCC signal-output terminal, the transmission sub-path of the PCC path, and the front-end module then transmits the amplified local data signals in the PCC frequency band.

* * * * *